United States Patent [19]

Ebner

[11] Patent Number: 4,890,377

[45] Date of Patent: Jan. 2, 1990

[54] METHOD OF MAKING CUMMUTATORS

[75] Inventor: Howard A. Ebner, Glencoe, Ill.

[73] Assignee: Resinoid Engineering Corporation, Newark, Ohio

[21] Appl. No.: 165,390

[22] Filed: Feb. 29, 1988

Related U.S. Application Data

[60] Continuation of Ser. No. 895,307, Aug. 11, 1986, abandoned, which is a division of Ser. No. 774,710, Sep. 11, 1985, Pat. No. 4,638,202.

[51] Int. Cl.$^4$ ............................................. H01R 43/06
[52] U.S. Cl. ........................................ 29/597; 310/43; 310/234; 310/236
[58] Field of Search ................... 29/597; 310/234–236, 310/43

[56] References Cited

U.S. PATENT DOCUMENTS

| | | | |
|---|---|---|---|
| 3,539,854 | 11/1970 | Futterer | 310/233 |
| 3,590,296 | 6/1971 | Dumez | 310/234 |
| 4,188,713 | 2/1980 | Kawano et al. | 29/597 |

FOREIGN PATENT DOCUMENTS

| | | | |
|---|---|---|---|
| 1089055 | 11/1957 | Fed. Rep. of Germany | 310/234 |
| 73714 | 9/1960 | France | 29/597 |

Primary Examiner—Carl E. Hall
Attorney, Agent, or Firm—Wood, Dalton, Phillips, Mason & Rowe

[57] ABSTRACT

A commutator assembly includes a core of insulating material surrounded by a plurality of commutator segments. A disk-like riser plate is molded at one end of the commutator with slots for receiving and holding the coil ends of an appropriate motor armature in engagement with respective ones of the commutator segments. Outwardly flared walls are molded on the side of the riser plate facing the armature, the walls diverging toward the slots for guiding the coil ends into the slots.

14 Claims, 1 Drawing Sheet

U.S. Patent     Jan. 2, 1990     4,890,377
FIG. 1
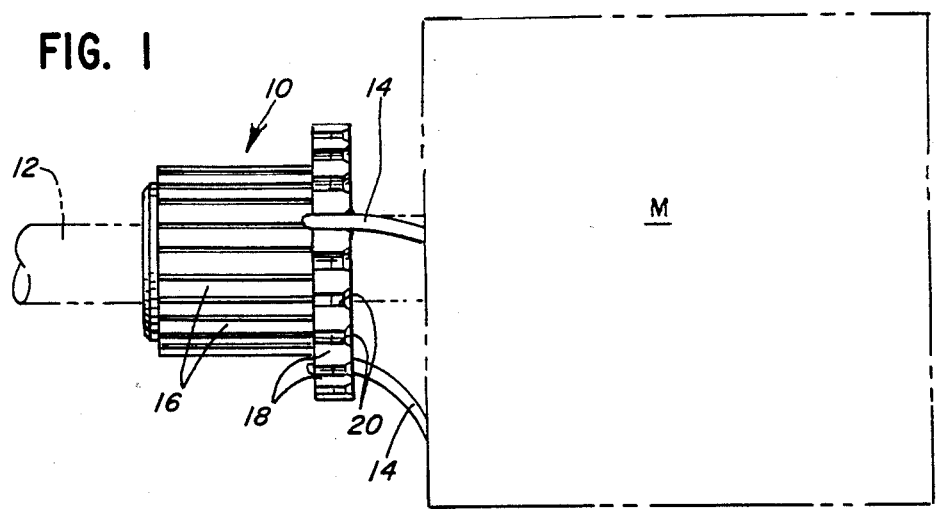
FIG. 2 PRIOR ART
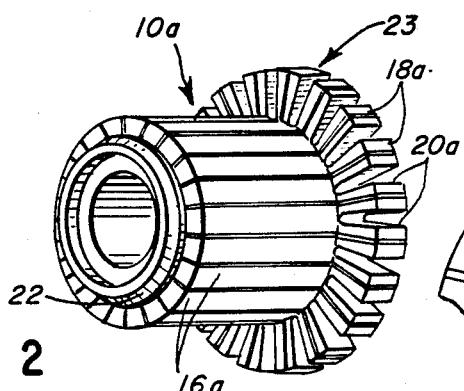
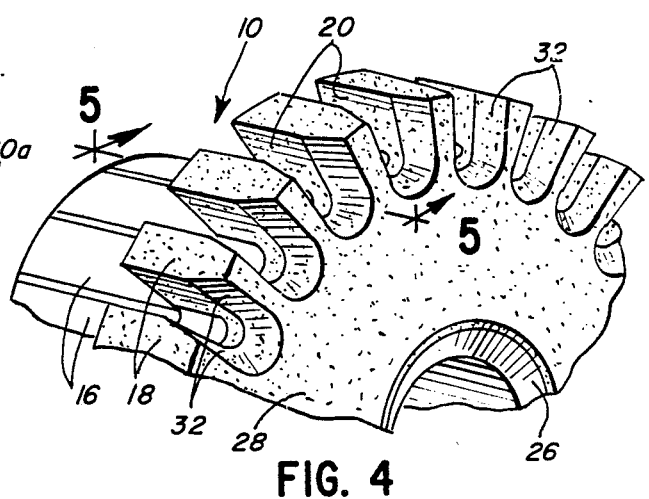
FIG. 4
FIG. 3
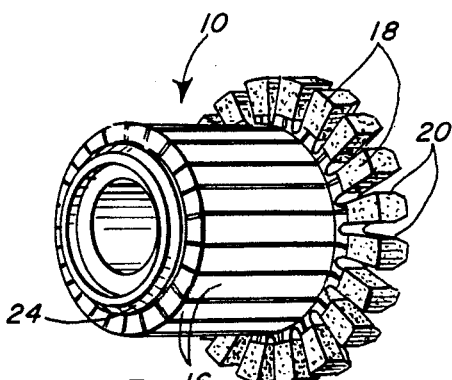
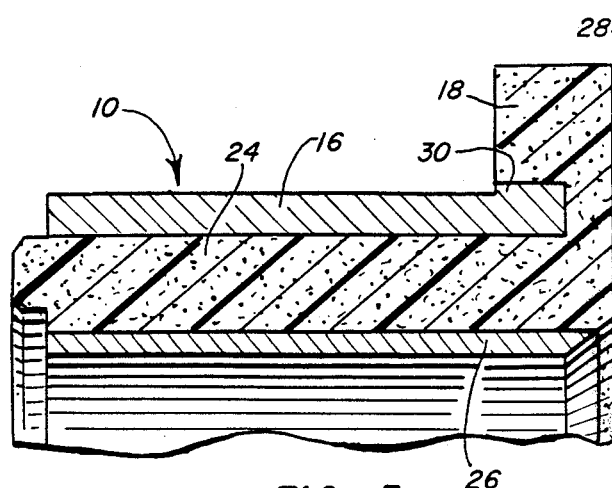
FIG. 5

METHOD OF MAKING CUMMUTATORS

This application is a continuation of application Ser. No. 895,307, filed Aug. 11, 1986, now abandoned, which is a division of Ser. No. 774,710, filed Sept. 11, 1985, now U.S. Pat. No. 4,638,202, issued Jan. 20, 1987.

BACKGROUND OF THE INVENTION

This invention relates to current distribution devices and, more particularly, to molded commutator assemblies in which the coil ends are secured to commutator segments disposed about a molded core.

A conventional commutator assembly normally includes a core of insulating material having a plurality of commutator segments disposed around the core and extending longitudinally thereof. Some form of locating or securing means are provided at one end of the commutator segments for receiving and holding the coil ends of an appropriate motor armature in engagement with respective ones of the commutator segments. The coil ends must be accurately and effectively located to achieve and insure the shortest possible welding or brazing cycles in permanently connecting the coil ends to the commutator segments. Although welding is a common term, the coil ends actually are fused to the commutator segments. The fusing is somewhat akin to resistance welding but more on the order of hot staking.

For instance, some commutator assemblies have segments anchored in the molded core of the assembly. The segments are fabricated from relatively thin sheet material, such as copper, and one end of each segment is provided with a bent hook element for receiving and holding a coil end for subsequent welding or brazing. In somewhat larger commutator assemblies, each commutator segment is individually formed as a bar-like element. A composite riser means is formed at one end of the commutator, including a riser portion for each commutator bar. The riser portion has a slot formed therein for receiving and holding a coil end. Actually, the slot would normally receive plural or positive and negative wires. The risers are formed by machining down the commutator bars to form radially extending flanges at one end of the commutator, the flanges being provided with the slots for receiving the coil ends. The commutator bars are fabricated of appropriate material, such as copper.

Obvious problems are inherent in fabricating commutator assemblies of the latter type described above which include commutator bars having integral, slotted risers. For instance, there is a considerable waste of copper material in machining the bars down to form the slotted flanges. An additional fabricating step is required in forming the slots themselves. Furthermore, since the slots must be slightly narrower than the coil ends, it is somewhat difficult to position the coil ends into the slots in any efficient manner. Guide means may be formed on the risers about the slots, but this would require still additional fabricating steps.

Some commutator assemblies have commutator bars or segments formed with integral hooks at their ends for anchoring the coil ends or wires. Some of the same inherent problems described above are present with such assemblies.

This invention is directed to solving the above problems by providing a commutator assembly which includes riser means molded independently of the commutator segments for receiving and holding the coil ends.

SUMMARY OF THE INVENTION

An object, therefore, of the invention is to provide a commutator assembly having riser means including new and improved locating means for receiving and positioning the coil ends of an appropriate motor armature in engagement with respective ones of the commutator segments.

In the exemplary embodiment of the invention, the commutator assembly includes a core of insulating material, with a plurality of commutator segments or bars disposed around and extending longitudinally of the core. Riser means are formed independently of the commutator segments and disposed at one end of the core. The riser means include a plurality of locating slots for receiving and holding the coil ends in engagement with respective ones of the commutator segments.

As disclosed herein, the riser means comprises a disk-like plate having peripheral slots defining the locating means. The riser plate is molded of appropriate material either simultaneously with or subsequent to molding the commutator core.

Since the riser plate is fabricated by a molding process, guide means easily can be formed for guiding the coil ends into the riser slots. As disclosed herein, the guide means are molded in the form of flared walls on the side of the riser plate facing the armature, the flared walls diverging toward each anchoring slot.

Other objects, features and advantages of the invention will be apparent from the following detailed description taken in conjunction with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a somewhat schematic elevation of a commutator assembly mounted on the shaft of an electric motor, with coil ends of the motor armature anchored on the commutator;

FIG. 2 is a perspective view of a commutator assembly according to the prior art;

FIG. 3 is a perspective view of a commutator assembly according to the invention;

FIG. 4 is a fragmented perspective view, on an enlarged scale, illustrating the flared guide wall means adjacent each riser slot; and FIG. 5 is a fragmented longitudinal, central section, on an enlarged scale, through the commutator assembly fabricated according to the invention.

DETAILED DESCRIPTION OF THE PREFERRED EMBODIMENT

Referring to the drawings in greater detail, and first to FIG. 1, the general arrangement of a commutator assembly, generally designated 10, is illustrated and shows the commutator mounted on a shaft 12 of an electrical motor "M". The motor includes an appropriate armature having coil ends 14 anchored to the commutator. Specifically, the commutator includes a plurality of spaced bars or segments 16 fabricated of conductive material, such as copper, disposed about and extending longitudinally of an insulating core to define an outside, generally cylindrical surface. A riser 18 is formed for each commutator segment and includes a slot 20 for receiving and holding coil ends 14, usually positive and negative wires, for subsequent fusing to the respective commutator segment. The slots are usually but not always slightly smaller in width than the diameter of the coil ends to hold the coil ends until they are welded to the commutator segments.

FIG. 2 shows a commutator assembly, generally designated 10A, fabricated according to the prior art. Heretofore, commutator segments 16A were formed as individual bars of copper material or the like. The bars would be assembled to an insulating core 22, as by molding, whereby the bars are disposed about and extending longitudinally of the core in spaced relationship. In order to form risers 18A, the copper material of the bars would be machined down to leave radially extending riser means in the form of a composite flange, generally designated 23, facing the motor armature, as shown. Of course, the composite riser or flange 23 includes portions 18A of each commutator segment 16A. It can be seen that this process resulted in a considerable waste of the copper material. After forming the composite riser, each riser portion of each commutator assembly then had to be machined with a slot 20A to form anchoring means for receiving and holding the coil ends. Of course, this involves still another fabricating step. Since the slots may be slightly smaller than the coil ends to hold the coil ends for subsequent fusing, it oftentimes has been difficult to locate and guide the coil ends into the slots. Providing further guiding surfaces would be cost prohibitive.

In order to solve these problems, the invention contemplates forming novel riser means independently of the commutator segments for receiving and holding the coil ends of the motor armature in engagement with respective ones of the commutator segments. More particularly, and referring to FIGS. 3 and 5, commutator assembly 10 includes a core 24 of insulating material with a plurality of commutator bars or segments 16 disposed around the core. As seen in FIG. 5, an insert or bushing 26 may be provided within core 24 for press fit onto shaft 12 (FIG. 1).

The riser means of the invention is fabricated in the form of a molded disk-like plate 28 at the end of the commutator facing the motor. The plate is thereby separate or independent of commutator segments 16. The riser plate is molded with locating or anchoring means in the form of a plurality of peripheral slots 20 for receiving and holding the coil ends of the motor armature. It can be seen in FIG. 5, that commutator segments 16 may have been machined slightly to form radially extending flange portions 30. The machining is done to true up the roundness of the commutator with a very small depth of cut, the flange portions being shown somewhat exaggerated.

Referring to FIG. 4, the invention contemplates providing molded riser plate 28 projecting radially outwardly beyond the cylindrical surface defined by the commutator bars (see also FIG. 5), with guide means adjacent each slot for guiding a coil end into the slot. More particularly, the guide means include flared walls 32 molded into the side of the riser plate facing the armature. The flared walls diverge toward the respective slot 20 to facilitate guiding a coil end into the slot. These flared walls are easily formed due to the fact that the riser plate itself is a molded component, and a wide variety of guiding means molded integrally with the riser plate are contemplated.

Riser plate 28 can be incorporated into the commutator assembly in various fashions. For instance, as illustrated in FIG. 5, the riser plate can be molded as an integral part of insulating core 24 as the core is molded within commutator segments 16. On the other hand, it may be desirable to provide the riser plate of a material different from the core, for instance material which is stronger than the molded core material. It is contemplated that the riser plate could be molded of thermosetting material, such as a phenolic material, with a stronger reinforcing matrix in the riser plate than in the core. Of course, high temperature thermoplastic materials are contemplated, as well as polyester material. It also is contemplated that the riser plate and core can be fabricated to the commutator segments by composite molding techniques, usually using compression or transfer type molds. In other words, the riser plate could be molded into its desired shape from a partially cured disk or "tablet", with the core material placed into the mold on top of the partially cured disk, and subsequently molded into locking engagement with commutator segments 16. These various methods of forming the riser plate not only independently of the commutator segments, but independently of the insulating core, enable the riser plate to comprise a different material from the core, such as when a higher impact material might be needed.

Furthermore, since the riser plate is a molded structure, a wide variety of locating and/or anchoring means are contemplated for the coil ends. For instance, instead of forming slots 20 in the riser plate, funnel-shaped holes are but one example of a different means for locating and/or holding the coil ends for subsequent fusing to the commutator segments.

In all of the fabrication techniques described above, it can be seen that the expensive and wasteful operations heretofore performed by machining the commutator segments to provide appropriate riser means for anchoring the coil ends is totally eliminated. In addition, molding the riser plate enables forming guide means adjacent the riser slots for the coil ends without any additional process steps whatsoever. The riser plate either can be molded integral with the insulating core or molded with a variety of different materials without requiring further process or assembly steps.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:
1. A method of fabricating a commutator assembly, comprising the steps of:
   providing a core of insulating material with a plurality of generally flat commutator segments disposed around and extending longitudinally substantially the entire length of the core, the segments combining to define an outside, generally cylindrical surface means with the segments being disposed substantially within the cylindrical surface; and
   molding riser means which are formed independent of the commutator segments to one end of the core and commutator segments, projecting radially outwardly beyond said surface means, with radially opening peripheral slots through which the coil ends of an appropriate motor armature are joined with respective ones of the commutator segments.

2. The method of claim 1 wherein said riser means is molded with guide means adjacent each slot for guiding a coil end into the slot.

3. The method of claim 2 wherein said guide means is molded in the form of flared wall means on the side of the riser means facing the armature, the flared wall means diverging toward the slot.

4. The method of claim 1 wherein said riser means is molded of plastic material.

5. The method of claim 1 wherein said riser means is molded of phenolic material.

6. The method of claim 1 wherein said core is molded in position within the commutator segments.

7. The method of claim 6 wherein said core and said riser means are molded simultaneously.

8. A method of fabricating a commutator assembly, comprising the steps of:
providing a core of insulating material with a plurality of generally flat commutator segments disposed around and extending longitudinally substantially the entire length of the core, the segments combining to define an outside, generally cylindrical surface means; and
molding a disk-like riser plate of plastic material at one end of the core and commutator segments, disposed around and extending longitudinally substantially the entire length of the core, the segments combining to define an outside, generally cylindrical surface means with the segments being disposed substantially within the cylindrical surface; and
molding a disk-like riser plate of plastic material at one end of the core and commutator segments, projecting radially outwardly beyond said surface means, with peripheral wall means having radially opening peripheral slots through which the coil ends of an appropriate motor armature are joined with respective ones of the commutator segments.

9. The method of claim 8 wherein said riser plate is molded with guide means adjacent each locating means for guiding a coil end into the locating means.

10. The method of claim 9 wherein said guide means is molded in the form of flared wall means on the side of the riser plate facing the armature, the flared wall means diverging toward a respective locating slot.

11. The method of claim 8 wherein said riser plate is molded of phenolic material.

12. The method of claim 8 wherein said core is molded in position within the commutator segments.

13. The method of claim 12 wherein said core and said riser plate are molded simultaneously.

14. The method of claim 12 wherein said core and said riser plate are molded by a composite molding technique wherein the riser plate and the core are of different plastic materials.

* * * * *